United States Patent [19]

Furuta et al.

[11] 4,110,183

[45] Aug. 29, 1978

[54] PROCESS FOR DENITRATION OF EXHAUST GAS

[75] Inventors: Isao Furuta; Yoshimi Takiguchi, both of Kobe, Japan

[73] Assignee: Kobe Steel, Ltd., Kobe, Japan

[21] Appl. No.: 820,316

[22] Filed: Jul. 29, 1977

[30] Foreign Application Priority Data

Jul. 31, 1976 [JP] Japan .................. 51-91760

[51] Int. Cl.² .............................................. B01J 1/10
[52] U.S. Cl. ............................................ 204/157.1 R
[58] Field of Search ................................. 204/157.1 R

[56] References Cited

FOREIGN PATENT DOCUMENTS 679,939  2/1964  Canada ............................ 204/157.1 R
48-51,190  1/1975  Japan ............................. 204/157.1 R

*Primary Examiner*—Howard S. Williams
*Attorney, Agent, or Firm*—Oblon, Fisher, Spivak, McClelland & Maier

[57] ABSTRACT

A process for removing nitrogen oxides from exhaust gases which comprises;
    introducing an oxidizing gas into the exhaust gas to oxidize the nitrogen monoxide contained therein to nitrogen dioxide and thereby form a first oxidized exhaust gas;
    irradiating said first oxidized gas with actinic light to oxidize said nitrogen dioxide to nitric acid and thereby form a second oxidized exhaust gas; and
    removing said nitric acid from said second oxidized exhaust gas.

9 Claims, 9 Drawing Figures

PROCESS FOR DENITRATION OF EXHAUST GAS

BACKGROUND OF THE INVENTION (1) Field of the Invention

This invention relates to a process for the denitration of exhaust gases, and more particularly to a denitration process which includes light irradiation to convert nitrogen dioxide into nitric acid.

More specifically, the present invention relates to a denitration process for exhaust gases in which the nitrogen oxide contained in the exhaust gas is oxidized with an oxidizing gas such as a chlorine dioxide gas ($ClO_2$), ozone gas ($O_3$) or the like to produce nitrogen dioxide ($NO_2$), and the exhaust gas is then subjected to light irradiation in the presence of chlorine dioxide or ozone gas and nitrogen dioxide so as to convert the latter into nitric acid which may be recovered.

(2) Description of the Prior Art

Many processes have been proposed for removing nitrogen oxides ($NO_x$) contained in various exhaust gases. These processes include: (A) washing the nitrogen oxide with an oxidizing solution such as a bleaching powder solution, a chlorous acid solution, or a hydrogen peroxide solution, (B) reacting the nitrogen oxide with an oxidizing gas such as chlorine dioxide, chlorine or ozone gas, and (C) treating the nitrogen oxide with a reducing solution such as sodium sulfite solution or a mixture of an organic chelate compound solution and a sodium sulfite solution.

These processes possess a variety of advantages and disadvantages and difficulty is encountered in determining their superiority from an economic viewpoint. For instance, process (C) using a reducing solution is not recommended for exhaust gases from a sintering furnace or coal boiler, because a large amount of oxygen is contained in the exhaust gas. In addition, process (A) including oxidizing and absorbing steps by using liquid oxidizer suffers from its lowered efficiency, when applied to an atmosphere which does not produce an oxidizing gas, thus resulting in a $NO_x$-removal rate in the order of at most 40 to 70%. In contrast thereto, process (B) using an oxidizing gas, particularly, chlorine dioxide gas or ozone gas provides a strong oxidizing ability and hence excellent efficiency in the removal of nitrogen oxide, although this process has some drawbacks.

For instance, in the case of oxidizing nitrogen monoxide (NO) with chlorine dioxide gas ($ClO_2$), the following reaction occurs:

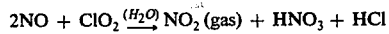

$$2NO + ClO_2 \xrightarrow{H_2O} NO_2 (gas) + HNO_3 + HCl$$

However, the chlorine dioxide gas ($ClO_2$) does not have the capability to oxidize nitrogen dioxide gas ($NO_2$), and thus only 50% of the nitrogen monoxide (NO) is oxidized. For this reason, it has been proposed to oxidize nitrogen dioxide ($NO_2$) with a sodium sulfite solution ($Na_2SO_3$). However, sodium sulfite ($Na_2SO_3$) is consumed in considerable quantities due to the oxygen ($O_2$) present in the gas, and in addition, the reaction mechanism nitrogen dioxide ($NO_2$) with sodium sulfite ($Na_2SO_3$) is complicated.

On the other hand, when oxidizing with ozone ($O_3$) gas, the following reactions take place:

$$NO + O_3 \rightarrow NO_2 + O_2 \quad \text{(first stage oxidation)}$$

$$2NO_2 + O_3 \rightarrow NO_3 \cdot NO_2 + O_2 \quad \text{(second stage oxidation)}$$

The second stage oxidizing reaction has a low reacting rate, so that an excessive amount of ozone ($O_3$) is required. In addition, a sodium sulfite solution ($Na_2SO_3$) is required to treat the excess ozone ($O_3$), which increases the ozone cost. For this reason, the above process is economically not desireable.

SUMMARY OF THE INVENTION

It is, accordingly an object of the present invention to provide a process for the denitration of exhaust gases, which avoids the shortcomings of the chlorine dioxide gas or ozone gas oxidizing processes.

It is another object of the present invention to provide a process for the denitration of exhaust gases, which has improved efficiency in converting nitrogen dioxide into nitric acid.

It is a still another object of the present invention to provide a process which only removes nitrogen oxide ($NO_x$) but also sulfur oxide ($SO_x$).

These and other objects of the present invention have been attained by a process which comprises the steps of: oxidizing nitrogen monoxide (NO) in an exhaust gas with chlorine dioxide gas ($ClO_2$) or ozone ($O_3$) to produce nitrogen dioxide ($NO_2$); and then irradiating the exhaust gas containing nitrogen dioxide and either chlorine dioxide or ozone gas with light having a suitable wave lenght to convert the nitrogen dioxide into nitric acid, i.e., accelerating the aforesaid second stage oxidizing reaction efficiently for the economical removal of nitrogen oxide ($NO_x$) with actinic light.

More specifically, the chlorine dioxide gas ($ClO_2$) or ozone ($O_3$) is brought into contact with an exhaust gas which contains $NO_x$ (In general, the $NO_x$ has a high content of NO, i.e., 90 to 95% and 5 to 10% $NO_2$), thereby oxidizing the nitrogen monoxide (NO) into nitrogen dioxide ($NO_2$). Then, the mixture of nitrogen dioxide thus produced and chlorine dioxide gas or ozone is irradiated with light having a suitable wavelenght.

These reactions are represented by the following formulas:

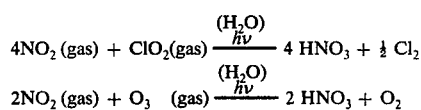

$$4NO_2 \text{(gas)} + ClO_2\text{(gas)} \xrightarrow[h\nu]{(H_2O)} 4 HNO_3 + \tfrac{1}{2} Cl_2$$

$$2NO_2 \text{(gas)} + O_3 \text{ (gas)} \xrightarrow[h\nu]{(H_2O)} 2 HNO_3 + O_2$$

These reactions proceed to only about 10% completion ($NO_2$... about 200 ppm) at a reaction dwell time of 10 to 15 seconds, if not irradiated with light, when irradiated with light the reaction proceeds to 100% completion. The nitric acid thus produced may be readily removed by washing the gas with water, or an aqueous alkaline solution such as sodium hydroxide solution (NaOH) or calcium hydroxide ($Ca(OH)_2$). When the oxidizing gas is chlorine dioxide ($ClO_2$), then a chlorine-base oxidizing gas or hydrogen chloride is produced. This gas may be removed by washing with an alkaline solution such as sodium hydroxide solution (NaOH) or calcium hydroxide ($Ca(OH)_2$) or a reducing agent such as calcium sulfate ($CaSO_3$) or sodium sulfate ($NaSO_3$). In addition, if desired this gas may be adsorbed onto an absorbing layer consisting of activated charcoal.

The reaction of nitrogen dioxide ($NO_2$) gas and chlorine dioxide ($ClO_2$) gas or ozone ($O_3$) is vigorous when the light has a wave length of 2000 to 4300Å, preferably 3000 to 4000 Å, and most vigorous at a wave length of 3650 Å. Light sources which may be employed in the present invention are high pressure or low pressure mercury lamps, high pressure gallium lamps, fluorescent lamps, xenon lamps, and the like. Most preferable is the high pressure mercury lamp which provides a large quantity of light having a wave length of 3650 Å.

The amount of chlorine dioxide gas ($ClO_2$) or ozone gas ($O_3$) which is to be used in oxidizing the nitrogen dioxide ($NO_2$) gas is somewhat dependent upon the amount of moisture contained therein. However, an amount of chlorine dioxide gas ($ClO_2$) of not less than 0.2 mol or ozone gas ($O_3$) of not less than 0.5 mol per 1 mol of nitrogen dioxide ($NO_2$) is sufficient. In practice, however, chlorine dioxide gas or ozone of a given amount is introduced into the exhaust gas to oxidize (NO) into nitrogen dioxide ($NO_2$), and then nitrogen dioxide thus produced is brought into reaction with either the residual or additionally introduced chlorine dioxide or ozone gas. In this respect, the amount of chlorine dioxide gas or ozone gas required for the first stage oxidizing reaction depends upon the moisture content in the system, but should be about ½ mol or 1.0 mol respectively, per 1 mol of nitrogen monoxide (NO), in general. In this case, chlorine dioxide gas in an amount not less than 0.2 mol or ozone gas in an amount not less than 0.5 mol should be additionally introduced into the exhaust gas for the second stage reaction, after completion of the first stage reaction, per mol of nitrogen dioxide present. It is preferred that at least 0.7 mol of chlorine dioxide or at least 1.5 mol of ozone be blown into the exhaust gas per 1 mol of nitrogen monoxide in the firon stage, the aforesaid amount of 0.7 mole or 1.5 moles being the sum of amount of chlorine dioxide gas or ozone, which is required for the first and second stage reactions.

The process of the present invention may not only be used for denitration of exhaust gases, i.e., the removal of $NO_x$, but also for the removal of $SO_x$. The denitration process of the present invention may be applied after the removal of dust and desulfurization, or simultaneously with the removal of dust or desulfurization of the exhaust gas.

BRIEF DESCRIPTION OF THE DRAWINGS

FIGS. 2 and 3 illustrate apparatus, for use in joint treatments of dust removal, desulfurization and denitration, in which FIG. 2 illustrates denitration following the dust removal and desulfurization, and FIG. 3 illustrates the desulfurization and denitration, following the dust removal;

DESCRIPTION OF THE PREFERRED EMBODIMENTS

The process for the denitration of exhaust gases of the present invention will be described in more detail with reference to the accompanying drawings.

Figure 1:
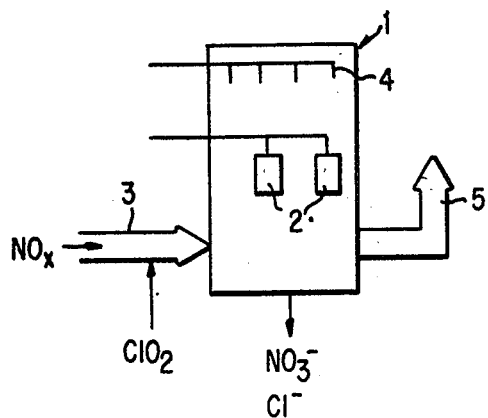
FIG. 1 illustrates apparatus for use in denitration of exhaust gases after removal of dust and desulfurization.
Figure 2:
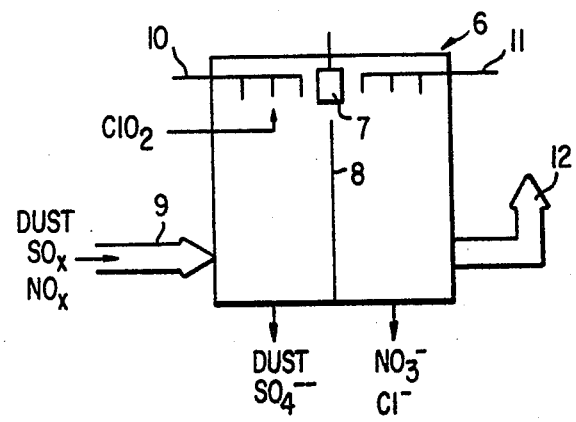
Figure 3:
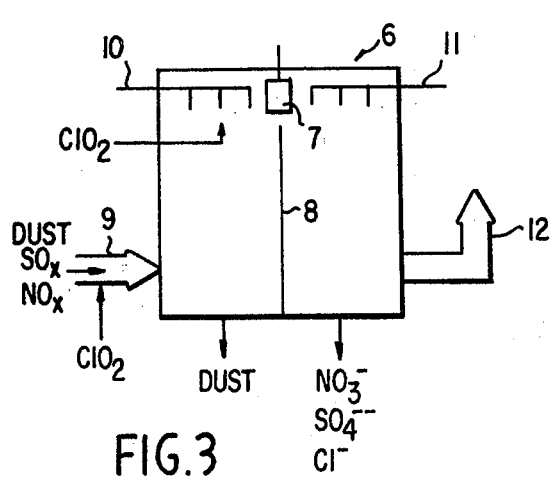

FIG. 1 schematically illustrates an apparatus which may be used in the present invention to denitrate a desulfurized exhaust gas, and FIGS. 2 and 3 schematically illustrate apparatus for use in the combined desulfurization, dust removal and denitration. In particular, FIG. 2 illustrates denitration following the removal of dust and desulfurization, FIG. 3 illustrates the desulfurization and denitration, after the dust removal, and FIG. 4 schematically illustrates an apparatus for the desulfurization and denitration of an exhaust gas having a lesser dust contact.

As shown in FIG. 1, there is provided a light source 2 (for instance, a high pressure mercury lamp) midway in the denitration reactor or reaction tub 1. An exhaust gas which contains $NO_x$ and has been subjected to dust removal and desulfurization treatments is introduced through duct 3 into the lower portion of the reaction tub 1. A given amount of an oxidizing gas (for instance, chlorine dioxide gas $ClO_2$) is admixed with the exhaust gas before the exhaust gas is introduced into the reaction tub 1, thereby oxidizing nitrogen monoxide (NO) into nitrogen dioxide ($NO_2$). The exhaust gas containing both nitrogen dioxide ($NO_2$) and chlorine dioxide ($ClO_2$) is irradiated with light from the light source 2 in the second stage oxidizing reaction, thereby producing nitric acid and chlorine gas ($Cl_2$). Then, the nitric acid and chlorine gas are absorbed into an alkaline solution, such as sodium hydroxide (NaOH) or calcium hydroxide ($Ca(OH)_2$) solution by a spraying process, and then removed or discharged from the bottom of the tub 1. The gas thus treated contains neither nitrogen dioxide ($NO_2$) nor chlorine gas ($Cl_2$) and is discharged through a discharge duct 5 to the atmosphere.

The apparatus as shown in FIG. 2 or 3 is used when the exhaust gas to be treated contains dust and $SO_x$ in addition to $NO_x$. (The apparatus of FIGS. 2 and 3 are substantially of the same arrangement). A light source 7 and a partition wall or plate 8 are provided in the center upper portion and center portion of a denitration reaction tub 6, respectively, and the exhaust gas is introduced through a duct 9 into a lower portion of the reaction tub 6. A Chlorine dioxide gas ($ClO_2$) is introduced into an upper portion of the tub 6 on the side the exhaust gas is introduced, so as to bring same in contact with the exhaust gas, and the nitrogen monoxide (NO) contained in exhaust gas is oxidized into nitrogen dioxide ($NO_2$). The nitrogen dioxide ($NO_2$) thus produced and chlorine dioxide gas ($ClO_2$) are together subjected, to irradiation with light from the light source 7, as the gas blows passed the light source, so that the nitrogen dioxide ($NO_2$) is subjected to the second stage oxidizing reaction to produce chlorine gas ($Cl_2$) and nitric acid. In this case, however, as shown in FIG. 2, a desulfurizing solution, such as a calcium hydroxide solution or an aqueous solution containing $CaCl_2$ is sprayed through pipe 10 provided in an upper portion of the tub on the exhaust gas-introducing side. As a result, the dust and $SO_x$ are absorbed into the aforesaid solution and discharged from the bottom of the tub 6. On the other hand, water or alkaline solution such as NaOH, Ca(OH)$_2$ or the like is sprayed through a pipe 11 provided in an upper portion of the tub 6 on the opposite side, so that nitric acid and chlorine gas produced according to the second stage oxidizing reaction may be absorbed therein and then discharged from the bottom portion of the tub 6. Alternatively, as shown in FIG. 3, water may be sprayed through a pipe 10 provided in an upper portion of the tub on the exhaust gas introducing side to adsorb dust alone, while an alkaline solution such as NaOH, Ca(OH)$_2$ and the like or a solution containing a CaCl$_2$ solution in addition to the aforesaid alkaline solution may be sprayed therethrough for to simultaneously achieve denitration and desulfurization. The exhaust gas thus treated contains no detrimental gases such as $NO_x$ and $SO_x$ and may be discharged through a discharge duct 12 to the atmosphere.

Figure 4:
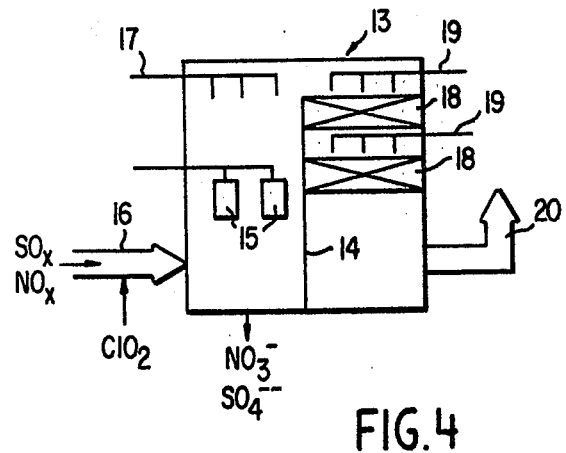
FIG. 4 illustrates an apparatus for use in desulfurization of exhaust gas containing lesser amounts of dust.

When the exhaust gas to be treated contains $SO_x$ and $NO_x$ but a relatively small amount of dust, or the case exhaust gas has been subjected to a dust-removing treatment, the apparatus shown in FIG. 4 may be used. In other words, a partition wall 14 is positioned in the center of the desulfurization-denitration reaction tub 13, and a light source 15 is positioned in the center portion of a chamber thus partitioned on one side. Then, exhaust gas containing $SO_x$ and $NO_x$ is introduced through a duct 16 into a lower portion of the chamber housing the light source 15 therein. Meanwhile, like the case of FIG. 1, chlorine dioxide ClO$_2$ is added to the exhaust gas to oxidize nitrogen monoxide (NO) into nitrogen dioxide (NO$_2$) before the exhaust gas is introduced into the reaction tub. The exhaust gas containing both nitrogen dioxide gas (NO$_2$) and chlorine dioxide gas is subjected to irradiation with light from the light source 15 for the second stage oxidizing reaction, the nitric acid and sulfuric acid thus produced are adsorbed by a spray of Ca(OH)$_2$, CaCl$_2$ solutions injected through a pipe 17 positioned in an upper portion of the tub and discharged from the bottom portion thereof ($SO_x$ is oxidized with ClO$_2$ into SO$_4$...). In addition, chlorine gas (Cl$_2$) which has been produced is adsorbed onto layer 18 containing an adsorbent such as activated charcoal, and then water is sprayed through a pipe 19 positioned above the adsorbent layer 18 to remove the chlorine gas thus adsorbed. The adsorbent layer 18 may be of a single or multiple layer type. The exhaust gas thus treated or converted is discharged through duct 20 at the atmosphere.

The chlorine gas (Cl$_2$) which has been produced when chlorine dioxide gas (ClO$_2$) is used as an oxidizing gas, may be adsorbed into alkaline solution as shown in FIGS. 1 to 3, or onto an adsorbent layer consisting of an activated charcoal as shown in FIG. 4. When the chlorine gas (Cl$_2$) is adsorbed onto an adsorbent, the chlorine gas (Cl$_2$) thus adsorbed may be recovered. In other words, the chlorine gas (Cl$_2$) is reacted with sodium chlorate to produce chlorine dioxide gas (ClO$_2$). Accordingly, an adsorbent layer may be provided in the embodiment as shown in FIGS. 1 to 3. When ozone gas is used for oxidation, byproduct chlorine gas Cl$_2$) is produced, and hence the adsorbent layer is not necessary.

The following examples are illustrative of the features of the process according to the present invention.

EXAMPLE 1

Figure 5:
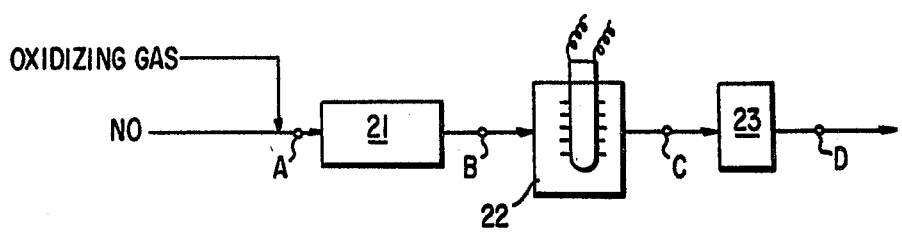
FIG. 5 is a flow sheet illustrative of the denitration process of the present invention.

Test equipment was provided as shown in FIG. 5, for determining the effect of light irradiation on nitrogen dioxide (NO$_2$) and chlorine dioxide (ClO$_2$). In the test the compositions of gases in respective sections were investigated. As shown in FIG. 5, the reactor is represented by the numeral 21, a light irradiating means by the numberal 22, and the washing tower by the numeral 23.

More particularly, chlorine dioxide gas (ClO$_2$) was introduced into a nitrogen-monoxide-introducing line. This chlorine dioxide gas (ClO$_2$) is produced by introducing a chlorine gas (Cl$_2$) into an aqueous solution containing a sodium chlorite, for reaction, and a nitrogen gas (N$_2$) is added to chlorine dioxide gas (ClO$_2$) to obtain a suitable composition. A flow-rate gauge is provided in the nitrogen monoxide gas (NO) and chlorine dioxide gas (ClO$_2$) introducing lines for adjusting the flow rate of these gases. The gas mixture of NO and ClO$_2$ thus adjusted was introduced into the reactor 21 (volume 500 ml) for reaction, so that nitrogen monoxide (NO) was converted into nitrogen dioxide (NO$_2$). Then, a gas mixture of NO$_2$ and ClO$_2$ was introduced to a light irradiating means (400 W mercury lamp, volume 1000 ml) for reaction of NO$_2$ and ClO$_2$ gases under irradiation with light. After the completion of the second stage oxidizing reaction, the gas thus treated was subjected to washing in the washing tower 23, The composition of gas in section (A) before the introduction of gas into the reactor, section (B) upstream of the light irradiating means, section (C) after the light irradiation, and section (D) after washing of exhaust gas was determined.

The results of the compositions thus obtained are shown in the following table.

| mercury lamp ON/OFF | composition of gas in section A | | composition of gas in section B | | | | composition of gas in section C | | | | composition of gas in section D | | |
|---|---|---|---|---|---|---|---|---|---|---|---|---|---|
| | NO (ppm) | ClO$_2$ (ppm) | NO (ppm) | NO$_2$ (ppm) | ClO$_2$ (ppm) | Cl$_2$ (ppm) | NO (ppm) | NO$_2$ (ppm) | ClO$_2$ (ppm) | Cl$_2$ (ppm) | NO$_2$ (ppm) | ClO$_2$ (ppm) | Cl$_2$ (ppm) |
| OFF | 200 | 150 | 0 | 95 | 51 | 10 | 0 | 65 | 40 | 13 | 45 | 10 | 0 |
| ON | | | 0 | 95 | 49 | 8 | 0 | 2 | 0 | 23 | 0 | 0 | 0 |
| OFF | 200 | 100 | 0 | 98 | 1 | .9 | 0 | 95 | 0 | 9 | 65 | 0 | 0 |
| ON | | | 0 | 98 | 2 | 8 | 30* | 68 | 0 | 8 | 45 | 0 | 0 |
| OFF | 200 | 125 | 0 | 97 | 23 | 7 | 0 | 80 | 16 | 10 | 60 | 2 | 0 |
| ON | | | 0 | 96 | 24 | 12 | 0 | 3 | 0 | 20 | 0 | 0 | 0 |

Note:
The symbol (*) denotes that the reaction NO$_2$→NO + O takes place, because of the absence of chlorine dioxide gas (ClO$_2$).

As can be seen from the above results, the following reaction takes place within the reactor 21:

$$2NO + ClO_2 + H_2O \quad NO_2 + HNO_3 + HCl$$

According to the reaction above, 0.5 moles of chlorine dioxide gas (ClO$_2$) per 1 mol of nitrogen monoxide (NO) is sufficient in this case 0.2 mol per 1 mol of nitrogen dioxide of chlorine dioxide gas is additionally introduced into the reactor upon light irradiation. If not, chlorine dioxide gas ($ClO_2$) is fully consumed in first stage oxidizing reaction to oxidize nitrogen monoxide (NO) into nitrogen dioxide ($NO_2$), with the result that the second stage oxidizing reaction does not proceed, and conversely nitrogen dioxide ($NO_2$) is decomposed into nitrogen monoxide. When 0.625 moles of chlorine dioxide gas blown into exhaust gas per 1 mol of nitrogen monoxide, the first and second stage oxidizing reactions proceeds almost 100, % completion, Even when an excess of chlorine dioxide gas is present in the absence of light irradiation (Lamp is turned off.), no oxidation of the nitrogen dioxide ($NO_2$) occurs.

EXAMPLE 2

In the apparatus as shown in FIG. 5, a Xe lamp (500W) was used as a light source, and the light irradiation was applied through wave-length-selective filters for various wave lengths, in the second-stage oxidizing reaction. The removal rate of nitrogen dioxide ($NO_2$) was measured. ($NO_2$: 100 ppm, $ClO_2$: 25 ppm). The results of measurements thus obtained are shown in FIG. 6.

Figure 6:
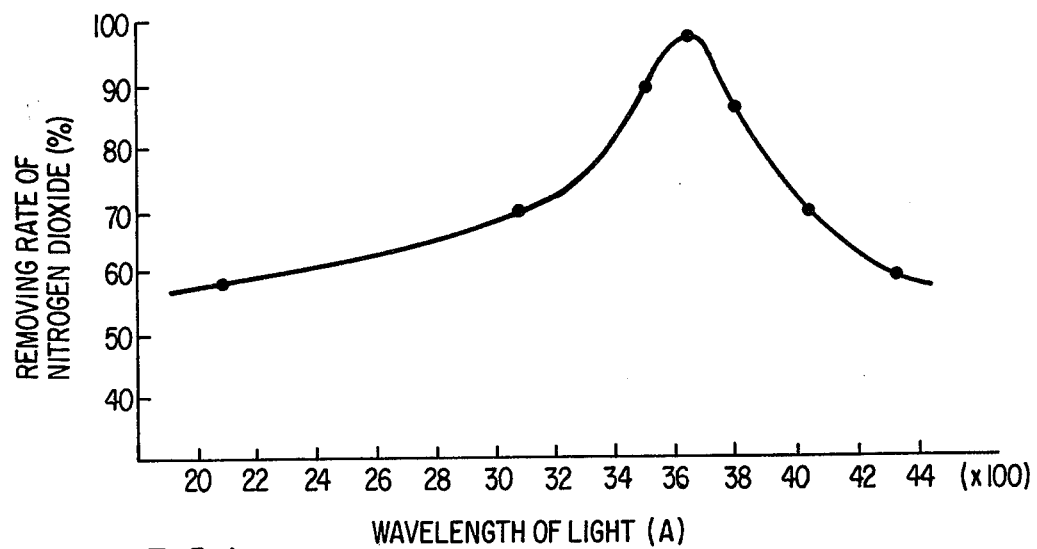
FIG. 6 is a plot showing the relationship between the wave length of light and the removal rate of nitrogen dioxide ($NO_2$) in the second stage oxidizing reaction.

As can be seen from FIG. 6, the high efficiency in removing nitrogen dioxide is obtained at light wave lenghts ($\lambda$) ranging from 2000–4300 Å, preferably 3000–4000 Å.

EXAMPLE 3

In the apparatus as shown in FIG. 5, there was used a light source which afforded an incident ultra-violet light intensity of $1.28 \times 10^{-2}$ mol.qut./hr, and chlorine dioxide gas was blown into gas which contained nitrogen monoxide (NO) at a concentration of 200 ppm for the first-stage oxidizing reaction and the second-stage oxidizing reaction under irradiation with light, and the denitration rate was measured. The measurements of denitration rate are shown in FIG. 7 at varying amounts of chlorine dioxide gas and durations of irradiation.

Figure 7:
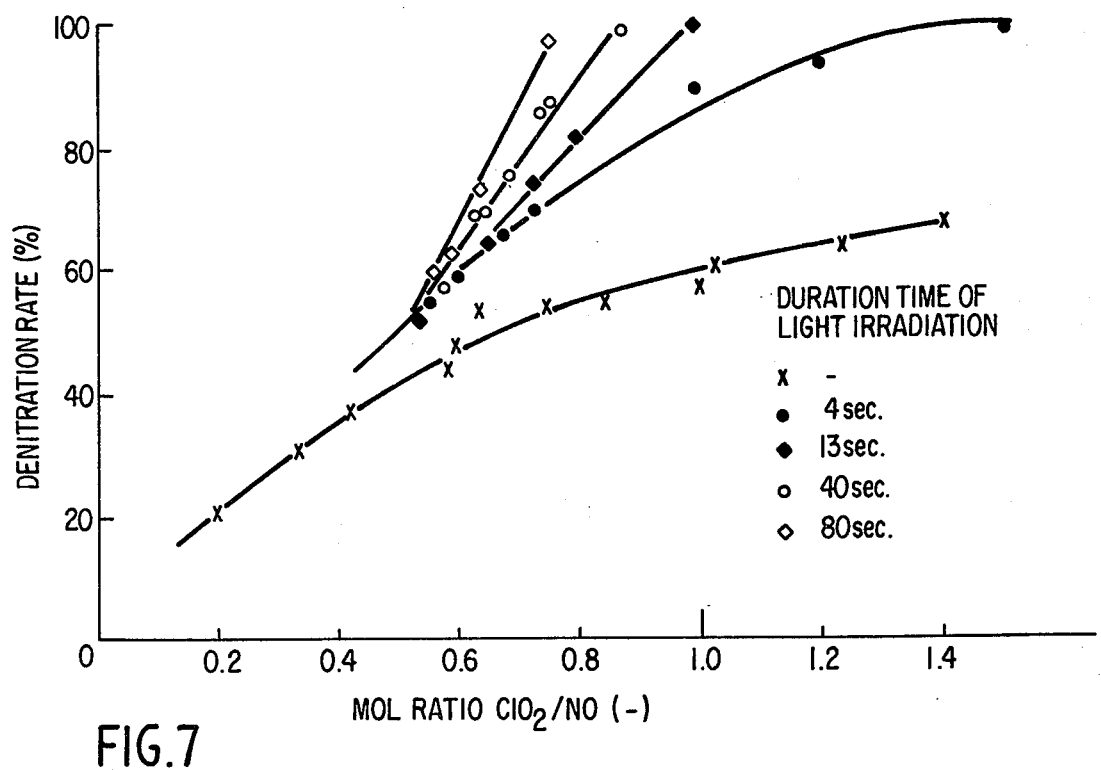
FIG. 7 is a plot showing the relationship between the amount of nitrogen monoxide (NO) contained in exhaust gas, to the amount of chlorine dioxide ($ClO_2$) gas to be blown into the former.

As is apparent from FIG. 7, as the ratio of NO concentration contained in exhaust gas to the concentration of $ClO_2$ gas is increased, the denitration rate is increased. When the above ratio is not less than 0.7 a denitration rate of not less than 70% may be achieved.

EXAMPLE 4

In the apparatus as shown in FIG. 5, there was used a light source which afforded an incident ultra-violet intensity of $1.28 \times 10^{-2}$ mol.qut./hr, and an ozone gas was blown into a gas which contained nitrogen monoxide at a concentration of 200 ppm for the first stage oxidizing reaction and the second-stage oxidizing reaction was conducted with light irradiation. The conversion rate from NO to $NO_2$ and a denitration rate were measured, the results of which are shown in FIG. 8 and 9 at the varying amounts of ozone gas, and duration of irradiation.

Figure 8:
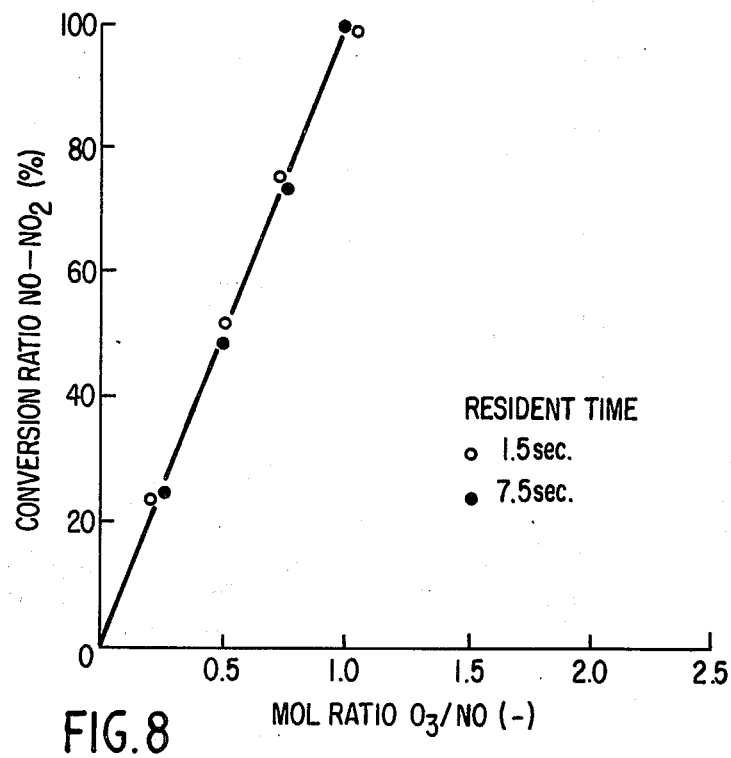
FIG. 8 is a plot showing the conversion ratio from NO to $NO_2$ when the ratio of NO concentration to the concentration of $O_3$ gas is changed.

As is apparent from FIG. 8, NO is completely converted to $NO_2$ when the ratio of NO concentration to the concentration of $O_3$ is increased over 1.0.

Figure 9:
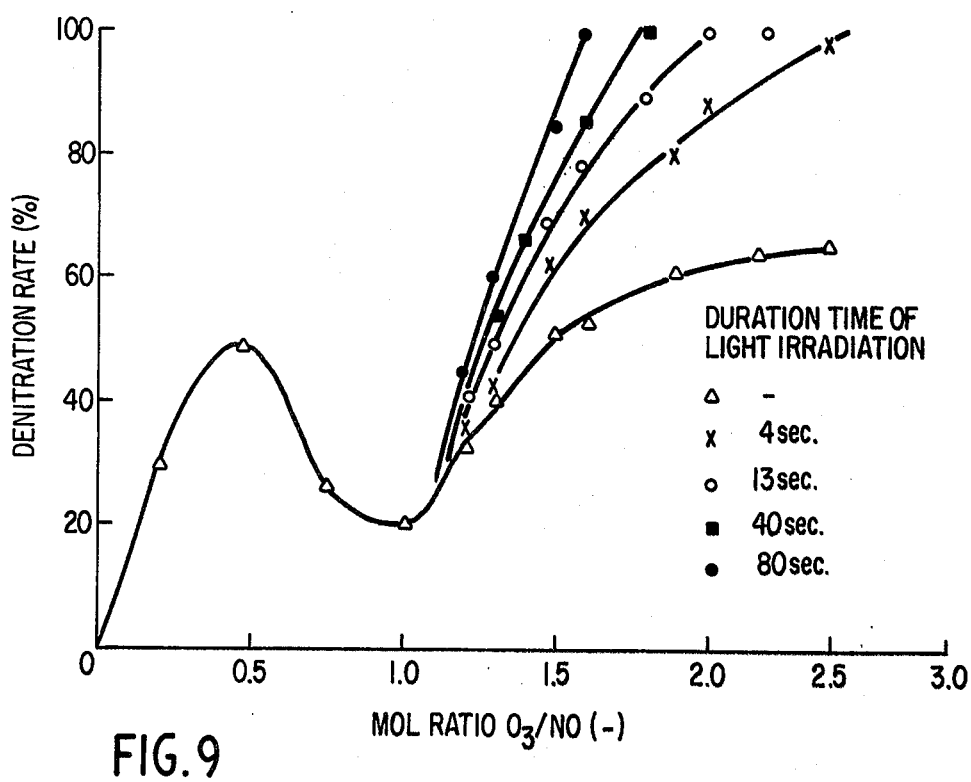
FIG. 9 is a plot showing the relationship between the amount of nitrogen monoxide (NO) contained in exhaust gas to the amount of ozone ($O_3$) gas to be blown into the former.

As is apparent from FIG. 9, as the ratio of NO concentration to the concentration of $O_3$ gas is increased, the denitration rate is increased. When the above ratio remains at not less than 1.5, a denitration rate of not less than 70% may be achieved.

Although the present invention has been described with respect to specific details of certain embodiments thereof, it is not intended that such details be limitations upon the scope of the invention except insofar as set forth in the following claims.

What is claimed is:

1. A process for removing nitrogen oxides from exhaust gases which comprises:
   introducing an oxidizing gas into the exhaust gas to oxidize the nitrogen monoxide contained therein to nitrogen dioxide and thereby form a first oxidized exhaust gas;
   irradiating said first oxidized gas with actinic light to oxidize said nitrogen dioxide to nitric acid and thereby form a second oxidized exhaust gas; and
   removing said nitric acid from said second oxidized exhaust gas.

2. The process of claim 1 wherein additional oxidizing gas is introduced into said first oxidized exhaust gas.

3. The process of claim 2 wherein said oxidizing gas is chlorine dioxide.

4. The process of claim 3 wherein at least 0.5 moles of said chlorine dioxide are introduced into the exhaust gas per mole of nitrogen monoxide to form said first oxidized exhaust gas and then at least 0.2 moles of said chlorine dioxide are added to said first oxidized exhaust gas per mole of nitrogen dioxide contained therein.

5. The process of claim 2 wherein said oxidizing gas is ozone.

6. The process of claim 5 wherein at least 1.0 moles of said ozone are introduced into the exhaust gas per mole of nitrogen monoxide to form said first oxidized exhaust gas and then at least 0.5 moles of said ozone are added to said first gas per mole of nitrogen dioxide contained therein.

7. The process of claim 1 wherein said oxidizing gas is chlorine dioxide and at least 0.7 moles of said chlorine dioxide are introduced into said exhaust gas per mole of nitrogen monoxide contained therein.

8. The process of claim 1 wherein said oxidizing gas is ozone and at least 1.5 moles of said ozone are introduced into said exhaust gas per mole of nitrogen monoxide contained therein.

9. The process of claim 1, wherein said actinic light has a wave length of between 2000 and 4000 Å.

* * * * *